Dec. 29, 1959 K. R. LUNG 2,919,321
PRESSURE DIFFERENTIAL RESPONSIVE SNAP-ACTING
CONTROL FOR PUMPS AND THE LIKE
Filed Sept. 30, 1957 2 Sheets-Sheet 1

INVENTOR.
KENNETH R. LUNG
BY
Marechal, Biebel, French & Bugg
ATTORNEYS

Dec. 29, 1959 K. R. LUNG 2,919,321
PRESSURE DIFFERENTIAL RESPONSIVE SNAP-ACTING
CONTROL FOR PUMPS AND THE LIKE
Filed Sept. 30, 1957 2 Sheets-Sheet 2
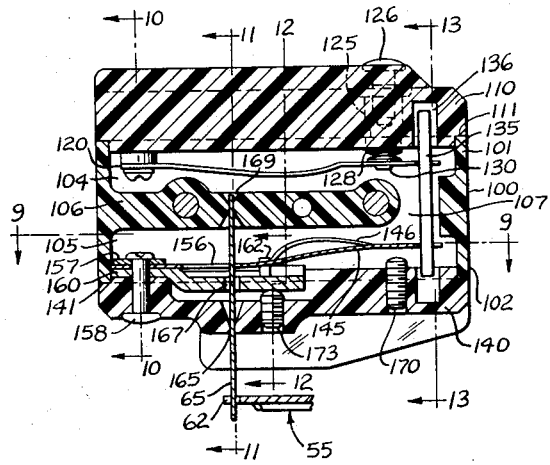
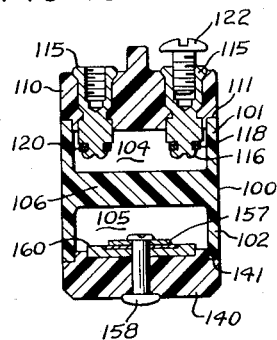
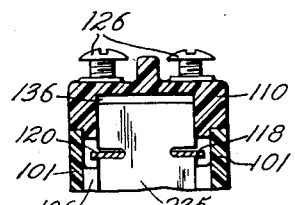
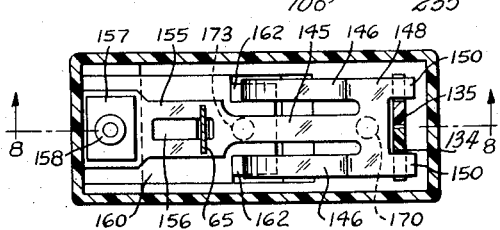
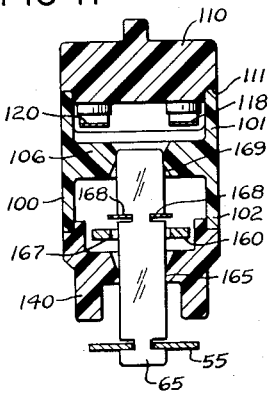
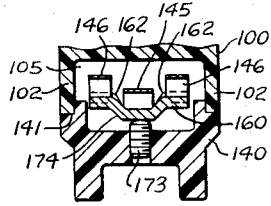
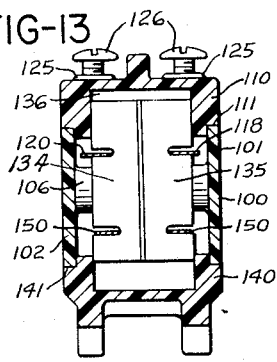
INVENTOR.
KENNETH R. LUNG
BY
ATTORNEYS

United States Patent Office 2,919,321
Patented Dec. 29, 1959

2,919,321

PRESSURE DIFFERENTIAL RESPONSIVE SNAP-ACTING CONTROL FOR PUMPS AND THE LIKE

Kenneth R. Lung, Dayton, Ohio, assignor to The Tait Manufacturing Company, Dayton, Ohio, a corporation of Ohio Application September 30, 1957, Serial No. 686,920

4 Claims. (Cl. 200—83)

This application relates particularly to pumps and to pressure differential responsive snap-acting switches for controlling the operation of pumps and the like.

The primary object of this invention is to provide an improved pressure differential responsive snap-acting switch which is capable of accurately controlling the operation of pumps and like motor driven devices.

Another object is to provide an improved multiple pole snap-acting pressure differential responsive switch which is operable to close in response to a first given pressure and to open in response to a second different pressure.

A further object is to provide such a switch wherein the electrically conductive switch elements are electrically insulated from the snap-acting driving mechanism and are driven by the driving mechanism through connections including a bi-directional lost motion connection which provides for acceleration of the driving mechanism before its motion is applied to the switch elements.

Another object is to provide such a switch including a plurality of cantilever mounted electrically conductive springs each carrying one of the movable contacts at its free end, and each spring being stressed to bias the contacts in closed position, and wherein an adjustment is provided for regulating the force required to initiate movement of the snap-acting device in switch opening and switch closing directions.

Other objects and advantages of the invention will be apparent from the following description, the accompanying drawings and the appended claims.

In the drawings—

Fig. 8 is a vertical section through the switch housing, as indicated by line 8—8 in Fig. 9;

Fig. 9 is a horizontal section through the switch housing, taken on line 9—9 in Fig. 8;

Fig. 10 is a vertical section taken on line 10—10 in Fig. 8;

Fig. 11 is a vertical section taken on line 11—11 in Fig. 8;

Fig. 12 is a partial vertical section taken on line 12—12 in Fig. 8;

Fig. 13 is a vertical section taken on line 13—13 in Fig. 8; and

Fig. 14 is a partial section similar to Fig. 13, taken through a modified switch.

Figure 1:
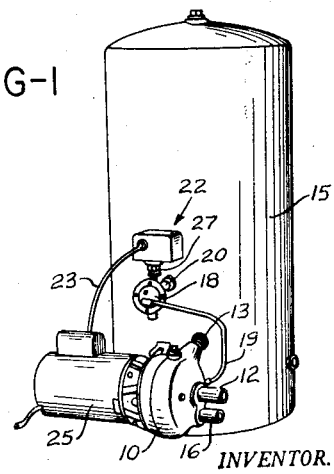
Fig. 1 is a perspective view of the portions of a pumping system incorporating the pressure differential responsive switch of the present invention.

Referring to the drawings, which illustrate a preferred embodiment of the present invention, Fig. 1 shows the housing 10 for a centrifugal pump having an inlet 12 and an outlet 13 attached to a tank 15. The pump inlet is connected through suitable piping to an ejector or jet pump (not shown), and the activating pressure fluid for such ejector is supplied from a secondary outlet 16 which is also connected through suitable piping to the ejector. A pressure regulator or air charging control 18 is connected through tubing 19 to the pump housing, and is also connected through a pipe 20 to tank 15. Mounted on a T in pipe 20 is the pressure differential responsive switch, shown generally at 22, to which this invention is particularly related, and this switch is connected through wiring 23 in circuit with the pump drive motor 25 so as to control operation of such motor.

Figure 2:
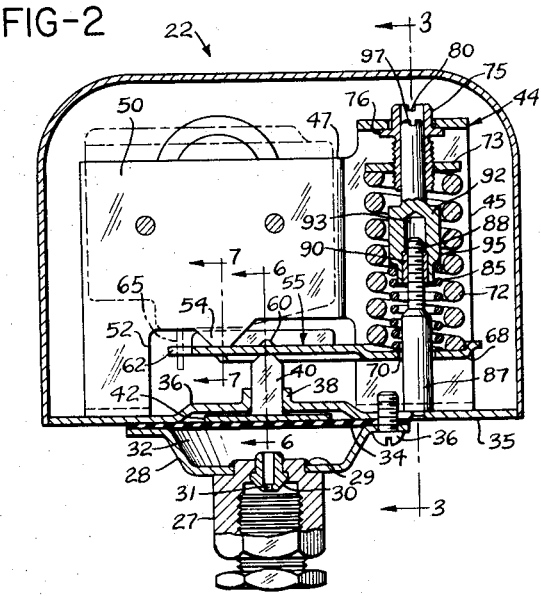
Fig. 2 is a view partly in vertical section, with some parts in elevation and with the switch housing shown in phantom lines, of the pressure differential responsive switch operating mechanism provided by the invention.

Referring to Fig. 2, the mounting for the switch includes a coupler 27 threaded for fastening on the T in pipe 20, and at its upper end a dished plate 28 is secured in a suitable manner, as by soldering or brazing at 29. A plug 30 extends from the inner end of coupler 27 into the interior of the dished plate 28, and includes a central orifice 31 through which the chamber 32 within the plate 28 is placed in pressure fluid communication with pipe 20. The plate 28 forms a cover for a flexible diaphragm 34 which is clamped between the upper flange of plate 28 and a cover plate 35 by suitable screws 36.

Figure 6:
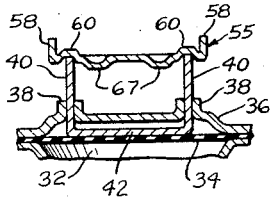
Fig. 6 is a partial section taken on line 6—6 of Fig. 2.
Figure 7:
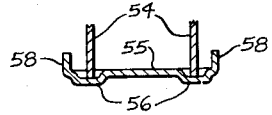
Fig. 7 is a partial section taken on line 7—7 of Fig. 2.

The plate 35 includes an upwardly dished portion 36 above the center of the diaphragm and vertically extending sides 37 which form part of the housing enclosure for the switch and pressure differential responsive mechanism. The dished portion 36 includes two upwardly formed and pierced sections 38 (Fig. 6) adapted to receive in sliding relation the operating legs 40 extending from a disk member 42 which in turn rests upon the upper surface of diaphragm 34, within the upwardly dished portion 36. A supporting bracket 44 including opposite side plates 45 is secured to the upper surface of cover plate 35 by bolts 46, and bracket 44 also includes inwardly curved portions 47 from which the parallel side mounting plates 50 extend in more closely spaced relation than the side plates 45 to receive the switch housing therebetween, as will be described below.

Figure 5:
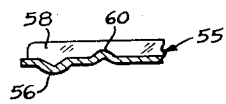
Fig. 5 is a partial sectional view taken on line 5—5 of Fig. 4.

Each of the side plates 50 is provided with a cut-away section 52 including a generally triangular part 54 extending from the upper edge of the cut-away in each side plate, and the apexes of these parts 54 are laterally aligned to define a fulcrum line about which the operating lever arm 55 is adapted to rotate. This lever arm is shown in detail in Fig. 5 as including downwardly dimpled portions 56 each adapted to receive the apex of the fulcrum forming parts 54, and upwardly extending flanges 58 at opposite sides of the lever arm for stiffening the forward end of the lever arm. Upwardly dimpled portions 60 are provided at opposite sides of the lever arm in transverse alignment to receive the upper pointed ends of the operating legs 40. On the forward end of the lever arm, on the opposite side of the fulcrum line dimples 56 from the dimples 60, there is formed a slot 62 adapted for engagement with a switch operating arm 65 (Figs. 8 and 11) which transmits motion of the lever arm to the snap-acting mechanism of the switch.

Lever arm 55 is further provided with embossed parts including longitudinally extending strengthening ribs 67 faired into a generally circular embossed portion 68, the center of which is pierced to provide a circular aperture 70. Seated in the concave upper portion of the circular embossed part 68 are the lower ends of two springs, the outermost spring 72 being a relatively long low rate spring, referred to hereafter as the pressure spring, and which determines the lower pressure to which the pessure differential responsive mechanism responds.

Figure 3:
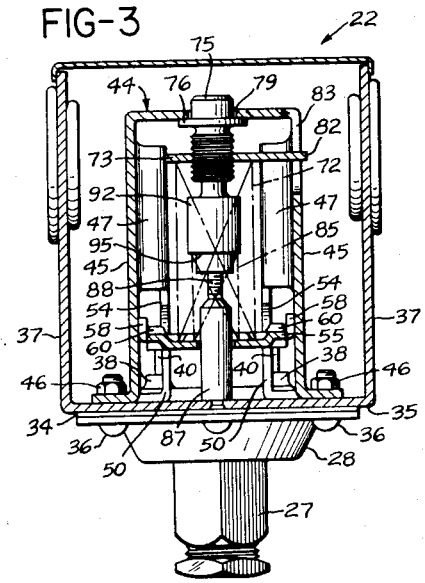
Fig. 3 is a view taken on line 3—3 of Fig. 2, with certain parts shown in elevation.
Figure 4:
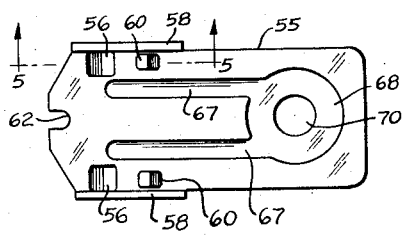
Fig. 4 is a detail view on an enlarged scale of the operating lever in the device shown in Fig. 1.

The upper end of spring 72 is seated upon a disk 73 which is in turn threaded on an adjusting cylindrical outer plug 75 having a shoulder 76 at its upper end which abuts the under surface of the bracket 44. The end of plug 75 extending beyond shoulder 76 projects through an aperture 79 in bracket 44, and suitable slots 80 are formed in the upper end of the adjustment plug to provide for rotation thereof by a screw driver or the like to adjust the position of disk 73, and thereby to adjust the pressure exerted by spring 72 against the lever arm, as will be apparent from inspection of Fig. 2. To prevent rotation of disk 73 during such adjustment, an integral ear 82 projects from one side thereof through a slot 83 formed in one of the bracket side plates 45, as shown in Fig. 3.

Coaxially fitted within spring 72 is the shorter high rate spring 85, hereafter referred to as the differential spring, which seats upon embossed portion 68 in the lever arm 55, and a pilot rod 87, fixed at its lower end to plate 35, projects upwardly through aperture 70 and centrally of spring 85. Rod 87 includes an externally threaded upper end 88 of reduced cross section which threadedly engages an internally threaded sleeve 90 press fitted within the lower end of an inner adjusting plug 92 having a central bore 93 into which the threaded end 88 of the rod may project. The lower end of plug 92 is reduced in cross section to provide an annular shoulder 95 upon which the upper end of differential spring 85 is seated, and the upper end of plug 92 is reduced in cross section so as to be received coaxially within the outer adjusting plug 75. A suitable cross slot 97 is provided in the upper end of plug 92 providing for rotation thereof to effect vertical adjustment with respect to the fixed pilot rod 87, thereby varying the effective force of differential spring 85 against the lever arm 55.

The operation of the pressure differential responsive mechanism may be briefly described as follows. As pressure in chamber 32 increases, diaphragm 34 tends to flex upwardly, pushing the operating arms upwardly and causing lever arm 55 to rotate in a counterclockwise direction about the fulcrum defining members 54, with consequent downward movement of the switch operating arm 65. Such movement of the lever arm is resisted by both the high rate differential spring 85 and the low rate pressure spring 72. The total resistance of these two springs determines the higher pressure on diaphragm 34 to which the mechanism responds. As pressure drops in chamber 32, the springs initially exert a force together tending to rotate lever arm 55 in a clockwise direction, and tending to move the switch operating arm 65 upwardly. After a relatively slight movement of the lever arm, the high rate differential spring 85 no longer exerts a substantial force, since the length of travel during which it is operative is relatively small, but pressure spring 72 continues to urge the lever arm in a clockwise direction, and the pressure in chamber 32 resisting the force of spring 72 alone is the low pressure to which the mechanism responds.

The switch which is operated by the above described pressure differential responsive mechanism is shown in detail in Figs. 8–13, and it includes a three-piece housing of insulating material including a central housing member 100 having upwardly and downwardly extending shoulders 101 and 102, respectively, defining an upper compartment 104 and a lower compartment 105 separated by a central web 106. At one end of housing member 100, an opening 107 extends through web 106 providing a passage between the upper and lower compartments. The upper housing 110 includes peripheral recesses 111 adapted to receive the upper shoulders 101 of the central housing member, and to be secured thereto in any suitable manner, successful results having been obtained by cementing these housing members together with a thermosetting plastic such as epoxy resin.

The drawing shows the switch as of the double pole single throw type, although it is apparent that other types of switches could readily be constructed in the same manner as set forth herein. Accordingly, at one end of upper housing member 110 is a pair of terminal or connection posts 115, preferably molded into the housing member. As shown in Figs. 8 and 10, one connection post 115 includes at its lower end a riveted connection 116 with one end of an electrically conductive leaf type spring 118, providing a cantilever type of mounting for the spring. In identical fashion a second electrically conductive leaf spring 120 is secured to the lower end of the other connection post. The upper ends of connection posts 115 are drilled and tapped to receive screws 122 for attaching an electrical wire to the connection post.

At the other end of upper housing member 110 terminal posts 125 are provided, of similar construction to the posts 115, and including connection screws 126 threadably received in their upper ends. The lower ends of posts 125 are rounded somewhat so as to provide fixed contacts 128 located in generally vertical alignment with movable contacts 130 carried on the free ends of springs 118 and 120. In a preferred embodiment these springs are initially stressed by an amount sufficient to insure proper contact closing pressure between the above mentioned fixed and movable contacts. The springs 118 and 120 with their contacts 128 therefore provide the movable elements of a double pole single throw switch of the type preferred in controlling the operation of pumps or the like, since with such a switch both lines to the motor may be opened when it is desired to stop operation of the pump.

Operating bars 134 and 135 of insulating arc-resistant material extends through opening 107 between the two compartments 104 and 105, and a recess 136 is provided in the upper housing member for receiving the upper end of bars 134 and 135. These bars may be made of any suitable electrically insulating material, and satisfactory results have been obtained with bars formed of glass fibers impregnated with a polyester resin. Referring to Fig. 13, horizontal slots 138 are formed in the sides of bars 134 and 135 adjacent its upper end for receiving the free ends of the electrically conductive springs 118 and 120. It will be apparent, therefore, that movement of the operating bars will effect substantially simultaneous opening and closing of the switch contacts 128 and 130, and at the same time the intermediate portion of the bars between slots 138 serve to insulate the two conductive springs from each other.

It should be noted, furthermore, that the slots 138 are of a width greater than the thickness of springs 118 and 120. Therefore, when the bars are positioned to retain the springs in one position, and the bars are then driven to the other position, i.e., from closed to open positions of the contacts, there is a momentary delay during the movement of the bars through the distance they must travel to engage the opposite side of the slot, assuming that the bar is relatively stationary. This relation of these parts provides a bi-directional lost motion connection which is an important feature of the invention, as will be seen from the following discussion pertaining to the driving mechanism and operation of the device.

A lower housing member 140, also molded of insulating material, is provided with a peripheral recess 141 receiving the downwardly extending shoulders 102 of the central housing member, and these members are secured to each other in the same manner as described in connection with the upper housing member 110. The lower compartment 105 houses a snap-acting driving mechanism for imparting a snap action to the opening and closing movements of the switch contacts, and this driving mechanism includes a metallic strip divided into a central spring element 145 and outer spring elements 146 having an integral connection at the end 148 of the strip.

At the end of the strip is a central slot providing protruding legs 150 which are received within horizontal slots 152 in opposite edges of operating bars 134 and 135 adjacent the lower end thereof. Again, it should be noted that the slots 152 are greater in width than the legs 150. Movement of the snap-acting drive mechanism is thus tranferred to the operating bar and thence to the switch contacts. The central spring element 145 includes a widened portion 155 provided with a central opening 156, and beyond this opening the central spring element is clamped in fixed relation beneath a plate 157 which is secured to the lower housing member by a rivet 158.

A mounting member 160 is also fixed to lower housing member 140 by rivet 158, and this mounting member includes upwardly formed abutment members 162 (Fig. 9) which provide pivotal support for the ends of the outer spring elements 146. The distance between these abutments and the rivet 158 is determined with respect to the normally flat length of spring elements 146 so that when the spring elements are mounted in operative position, the elements 146 are in compression and central element 145 is in tension, defining an axis of maximum stress. When the element in tension is moved across this axis, the forces in the snap-acting device will reverse, in a well known manner, so as to move the free end 148 of the device upwardly and downwardly with a snap action.

The interaction of the snap-acting drive mechanism and the switch elements which results from the above described construction is particularly desirable from the standpoint of reliability of performance and long contact life. The contact pressure in a switch is one factor which determines the amount of current which the switch can carry. Rapid application and release of this pressure when closing and opening the switch, respectively, results in minimum arcing and thus prolongs the life of the contacts.

In the present construction, considering the switch closed as shown in Figs. 8 and 13, the contacts are pressed together by a force which is applied by the contact springs 118 and 120 themselves. This force is augmented by the pressure applied through the contact springs and bars 134 and 135 by the driving mechanism which is stressed to urge the legs 150 against the upper edge of slots 152. As the tension element 145 is moved across the axis of maximum stress the legs 150 leave the upper edge of slots 152 and the augmenting seating pressure upon the contacts diminishes, but the seating pressure is still maintained at a substantial value by the contact springs themselves.

As the tension element 145 crosses the axis of maximum stress the free end 148 of the snap-acting device accelerates and the legs 150 engage the opposite or lower edges of slots 152 during this accelerating movement, thereby applying a blow to the bars 134 and 135. The movement of legs 150 removes the supporting force which held the lower edges of slots 138 against the contact springs 118 and 120 (assuming that the device is supported in the position shown and that gravity will act upon the bars 134 and 135). As the blow imparted to the bars by the snap-acting driving mechanism causes them to accelerate, they in turn apply a blow to the contact springs as the upper edges of slots 138 engage the springs 118 and 120, respectively. The blow, applied to the free end of each spring, causes a slight bending of the contact springs which results in a wiping action at the contacts preceding opening thereof.

This lost motion connection thus imparts a contact breaking blow to the contact springs which, until the moment of this blow, are maintaining the contacts closed under pressure. The contacts are thus opened with an extremely rapid movement, and the duration between application of a positive contact pressure and opening of the contacts is extremely short, resulting in a minimum of arcing as the contacts open. The switch is held open by the snap-acting driving mechanism with legs 150 engaging the lower edges of slots 152, and the contact springs 118 and 120 engaging the upper edges of slots 138.

In closing the switch a similar action occurs. As the tension element 145 is moved across the axis of maximum stress the legs 150 are accelerated and rise rapidly to impart a blow to bars 134 and 135, thus striking a closing blow upon the contact springs 118 and 120 by engagement thereof with the lower edges of slots 138. Under certain circumstances it may be that the bars 134 and 135 are moved toward the closing position somewhat by the contact springs as the snap-acting mechanism accelerates, but the force in these springs is diminishing as they move toward contact closing position, the bias in these springs having been increased in opening the contacts. The rapidly accelerating snap-acting device thus overtakes any such slight motion due to the movement of the contact springs, and the contacts are closed with a blow, resulting in a rapid application of contact pressure by the contact springs, and augmented by the snap-acting driving mechanism.

Switching operating arm 65 extends through a guide slot 165 in lower housing member 140, through an opening 167 in the mounting member 160, and through the aperture 156 in spring element 146. The width of arm 65 is greater than the transverse width of aperture 156, though less than the length of such aperture. Suitable slots 168 are formed in opposite sides of arm 65 so as to engage spring element 145 when the arm 65 extends transversely thereof, as shown in Fig. 11. The upper end of arm 65 is received in guiding relation within a slot 169 formed in web 106. Movement of lever arm 55 will, therefore, initiate the operation of the snap-acting drive mechanism by moving the spring element 145 across the axis of maximum stress. The resultant momentary unbalancing of the forces in the snap-acting device will cause the end 148 to move with a snap action in either an upward or downward direction, depending upon the initiating movement of arm 65.

The connection between the pressure differential responsive mechanism and the snap-acting driving mechanism as described above is particularly advantageous from the standpoint of preventing stalling of the device during operation. The resistance to rotation of arm 55 as pressure increases is provided by the differential spring mechanism, acting on the same side of the pivot 54 as the pressure responsive operating legs 40, and by the arm 65 on the opposite side of the pivot. As pressure increases and arm 55 thus pulls arm 65 downwardly, the resistance to movement provided by the snap-acting driving mechanism decreases as that mechanism approaches the axis of maximum stress. It follows, therefore, that as the resistance provided through arm 65 decreases, the lever arm 55 is accelerating as it moves to operate the snap-acting mechanism, and the force tending to move the tension spring element 45 across the axis of maximum stress is increasing, eliminating the possibility of stalling at this point.

It is desirable to reduce the forces necessary to close the switch to a minimum, in order to provide for the best possible response. Accordingly, an adjusting screw 170 is threadedly received in lower housing member 140 beneath the free end 148 of the snap-acting device. The upper end of this screw provides an abutment for the snap-acting device which may be adjusted to a position where the snap-acting mechanism is stopped in its downward travel just beyond the line of the axis of maximum stress. Thus any slight movement of operating arm 65 in an upward direction will result in a rapid upward snap action of the device. Likewise, in order to provide for a minimum operating force in the opposite or downward direction, an adjusting screw 173 is threadedly received within housing member 140, and abuts a downwardly dished central part 174 of mounting element 160. Adjustment of screw 173 will vary the location of the abutments 162 which in turn define the pivotal axis of compression spring elements 146, and adjustment of this pivotal axis when the switch contacts are in their closed position will provide for a minimum movement of the free end of the snap-acting mechanism between its upward position, defined by closing of the switch contacts, and the axis of maximum stress which the snap-acting device will rapidly traverse in a switch opening direction.

It will thus be seen that the present invention provides a multiple pole pressure differential responsive snap-acting switch capable of fine adjustment so as to initiate operation of the switch in one direction in response to one pressure, and in another direction in response to a second different pressure. The electrically conductive parts of the switch are completely insulated from the snap-acting driving mechanism and the size and current carrying characteristics of the movable elements of the switch may be varied accordingly without a complete redesign of the snap-acting driving mechanism. The adjustment features provided by the present invention are such as to permit the calibrating of the entire switch and pressure differential mechanism to within close limits without maintaining close tolerances in manufacture.

This application is a continuation-in-part of my earlier application Serial No. 618,824, filed October 29, 1956, now abandoned.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A snap-acting multiple pole switch comprising a housing of insulating material divided into two compartments, a plurality of fixed contacts mounted in one of said compartments, a plurality of movable contacts mounted in said one compartment for selective movement into and out of engagement with certain of said fixed contacts to provide the movable elements of a multiple pole switch, movable operating bars of insulating material extending between said compartments, a driving connection between said bars and said movable contacts providing for movement thereof in both directions substantially in unison, a snap-acting driving mechanism including a plurality of spring elements, means supporting said driving mechanism in the other said compartment with at least one of said spring elements in tension and another said spring element in compression defining an axis of maximum stress, means for moving said spring element in tension across the axis of maximum stress to initiate the snap action of said snap-acting device, a further driving connection between said driving mechanism and said operating bars for moving said bars and operating said movable contacts in both directions with a snap action, and one of said driving connections including a bi-directional lost motion connection providing for acceleration of said driving mechansm before applying a switch opening and/or closing movement to said bars.

2. A snap-acting multiple pole switch comprising a housing of insulating material divided into two compartments, a plurality of fixed contacts mounted in one of said compartments, a plurality of movable contacts mounted in said one compartment for selective movement into and out of engagement with certain of said fixed contacts to provide the movable elements of a multiple pole switch, a movable operating bar of insulating material extending between said compartments, a driving connection between said bar and said movable contacts providing for movement thereof in both directions substantially in unison, a snap-acting driving mechanism including a plurality of spring elements, means supporting said driving mechanism in the other said compartment with at least one of said spring elements in tension and another said spring element in compression defining an axis of maximum stress, means for moving said spring element in tension across the axis of maximum stress to initiate the snap action of said snap-acting device, a further driving connection between said driving mechanism and said operating bar for moving said bar and operating said movable contacts in both directions with a snap action, and one of said driving connections including a bi-directional lost motion connection providing for acceleration of said driving mechanism before applying a switch opening and/or closing movement to said bar.

3. A pressure responsive snap-acting switch for use in controlling the operation of a pump or the like, comprising the combination of a housing of insulating material divided by a web into two compartments, a stationary electrical contact mounted in one of said compartments, a movable contact mounted for movement into and out of engagement with said stationary contact to provide a switch, means providing for connection of said contacts in circuit with an electrically driven device providing for control thereof by said switch, a movable bar of insulating material extending between said compartments, a snap-acting driving mechanism in the other said compartment including a plurality of interacting spring elements, means supporting one of said spring elements in tension and another of said spring elements in compression to define an axis of maximum stress, means providing a bi-directional driving connection between said driving mechanism and said bar, means providing a further bi-directional driving connection between said bar and said movable contact, one of said driving connections including a bi-directional lost motion connection providing for acceleration of said driving mechanism prior to application of switch opening and/or closing movements to said bar.

4. A pressure responsive snap-acting switch as defined in claim 3, wherein the mounting for said movable contact includes an electrically conductive spring cantilever mounted in said one compartment and having a connection post for including said cantilever mounted spring in circuit with the electrically driven device.

References Cited in the file of this patent

UNITED STATES PATENTS

| | | |
|---|---|---|
| 2,487,374 | Riche et al. | Nov. 8, 1949 |
| 2,562,437 | Rothwell et al. | July 31, 1951 |
| 2,620,413 | Johnson | Dec. 2, 1952 |
| 2,729,720 | Jacobs | Jan. 3, 1956 |
| 2,743,332 | Torres | Apr. 24, 1956 |
| 2,754,388 | Beeman | July 10, 1956 |
| 2,790,870 | Hansen | Apr. 30, 1957 |
| 2,791,658 | Beeman | May 7, 1957 |
| 2,814,686 | Wilder | Nov. 26, 1957 |
| 2,821,588 | Fisher | Jan. 28, 1958 |